Patented Mar. 4, 1930

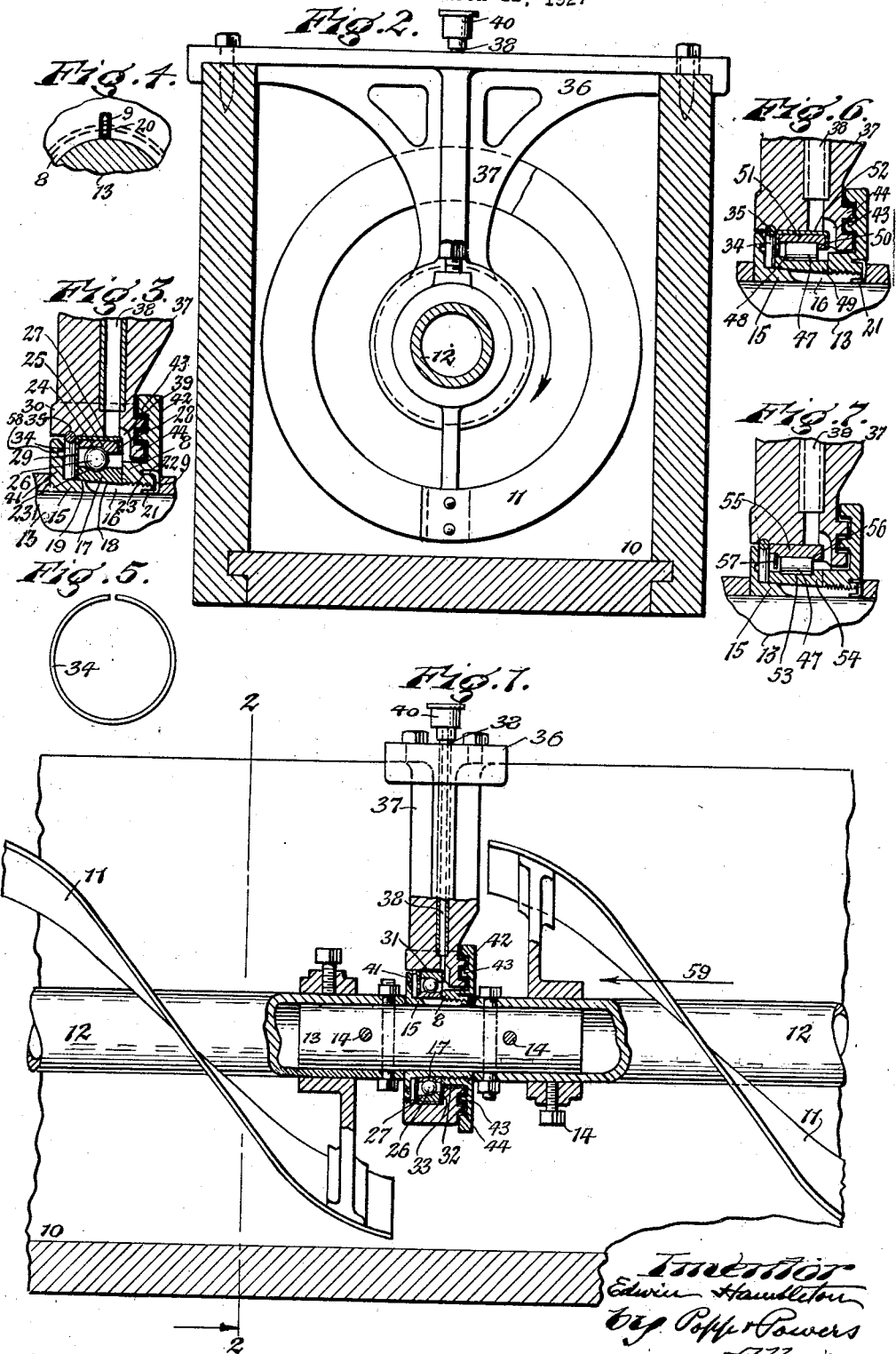

1,749,281

UNITED STATES PATENT OFFICE

EDWIN HAMBLETON, OF KENMORE, NEW YORK, ASSIGNOR TO THE TRANSMISSION BALL BEARING COMPANY INC., OF BUFFALO, NEW YORK, A CORPORATION OF NEW YORK

ROLLING BEARING

Application filed March 11, 1927. Serial No. 174,658.

This invention relates to a bearing which is more particularly intended for supporting the shaft of a conveyor which is virtually covered all the time in the material which is being propelled and therefore presents a difficult problem in lubrication.

Heretofore these bearings have been babbitted or formed in cast iron journals, which were rarely, if ever lubricated, and the structure was such that any lubricant applied to the bearing would not stay in place, thus causing the bearing to soon run dry, wear out rapidly and cause much trouble.

It is the object of this invention to provide a bearing for this purpose which is not only strong and durable in construction and efficient in operation but also one which will reliably retain the lubricant so that it will be constantly supplied to the bearing surfaces and also permit of readily replenishing the lubricant when required without interfering with the operation of the bearing and the parts associated therewith.

In the accompanying drawings:

Figure 1 is a vertical longitudinal section of a bearing embodying my invention and used for supporting the shaft of a conveyor on a conveyor trough.

Figure 2 is a vertical transverse section taken on line 2—2 Fig. 1.

Figure 3 is a fragmentary vertical longitudinal section of the bearing similar to Fig. 1, on an enlarged scale.

Figure 4 is a fragmentary side elevation of the bearing showing the locking key for preventing the supporting sleeve and one of its disks from unscrewing.

Figure 5 is a side view of the locking ring for holding the races of the rolling bearing members in place.

Figures 6 and 7 are fragmentary views similar to Fig. 3 showing modified forms of roller bearings capable of being employed in practicing my invention.

Similar characters of reference indicate like parts in the several figures of the drawings.

The numeral 10 represents a trough through which material is propelled lengthwise by a conveyor which may be of any suitable construction but, for example may consist of a plurality of spiral or helical conveyor screws 11 arranged lengthwise in the trough and each mounted on a tubular shaft 12. Motion may be transmitted to these shafts in various ways for turning the screw conveyors and causing the same to propel the material lengthwise in the trough. At their opposing ends the shafts of two adjacent conveyor screws are supported on the conveyor trough by the bearing which embodies my invention and which by preference is constructed as follows:

The numeral 13 represents a connecting shaft which has its opposite ends arranged in the opposing ends of the conveyor shafts and connected therewith by bolts 14, a space being left between the ends of the conveyor shafts to permit of mounting the same in the bearing containing my invention.

Mounted on the connecting shaft between the conveyor shafts is an adapter sleeve 15 which is secured to the connecting shaft so as to turn therewith, this being preferably accomplished by providing this sleeve with one or more longitudinal slots 16 extending inwardly from one end thereof, and a bearing or clamping ring 17 having a conical bore 18 which engages with the correspondingly shaped periphery 19 of the sleeve so that upon forcing said ring 17 inwardly the split parts of the sleeve will be contracted and pressed inwardly against the connecting shaft and caused to grip the same. The ring 17 is forced inwardly by a screw nut 8 engaging with an external screw thread formed on the split end of the sleeve, this screw nut being held against unscrewing by a U-shaped key or staple preferably made of wire and adapted to engage its cross bar 9 with a radial notch 20 in the outer side of the nut while its inner leg 21 engages with the outer end of a slot in the sleeve and its outer leg 22 engages with one or another of a plurality of openings 23 in the screw nut. The opposing ends of the conveyor shafts are arranged so close in the assembled position of the parts that the same either engage with or are so close to the outer sides of the clamping sleeve and nut that the key is held in engagement with the sleeve and nut.

On its outer side the clamping ring 17 is provided with a ball race 231 which is arranged opposite an internal ball race 24 on the bore of a bearing ring 25. A plurality of bearing balls 26 are arranged in an annular row between the inner and outer rings 17 and 25 and engage with the races thereof and form the rolling support of the bearing. These ball races are preferably so constructed that the same take the longitudinal thrust load as well as the radial bearing load.

A shell or casing is applied to the outer bearing ring which is preferably made of sheet metal and consists of a cylindrical body 27 engaging with the periphery of the outer bearing ring, a narrow inner flange 28 projecting inwardly from one edge of the body 27 and into engagement with one end of the outer bearing ring 25, and a wide outer flange 29 projecting inwardly from the other edge of the body 27 and across the annular gap between the inner and outer bearing rings and engaging with the other end of the outer ring but facing the opposite end of the inner ring and rotating relative thereto. By means of this greater protection is obtained against the entrance of dust to the bearing surfaces and the lubricating grease is also held more effectively between the bearing rings and rolling members.

Surrounding the bearing rings and associated parts is the housing 30 which is provided with a bore 31 of large diameter which engages with the periphery of the bearing shell or casing, and a bore 32 of smaller diameter which surrounds said screw nut and forms an internal shoulder 33 which is engaged by the inner flange 28 of the shell. The members constituting the rolling bearing unit are held within the housing and against the shoulder 33 of the same by means of a lock consisting preferably of a split ring 34 which engages its outer side with an annular groove 35 formed in the large bore of the housing and engages its inner part with the shell of the rolling bearing unit, as shown in Figs. 1, 3 and 5. This locking ring is retained in its operative expanded position due to its resilience but can be readily removed by contracting the same whenever it is desired to release the rolling bearing unit.

The housing is supported by means of a hanger having a cross bar 36 secured at its ends to the side walls of the conveyor trough and an arm 37 depending from the cross bar and connected at its lower end with the housing. Grease or other lubricant is supplied to the co-operating wearing surfaces of the bearing unit by a conduit formed partly by an upright pipe 38 which is embedded in the hanger, and a passage 39 formed in the housing and leading from the lower end of the pipe to the inner end of the gap between the bearing rings, as shown in Figs. 1 and 3. After grease has been introduced through the upper end of the pipe 38 the same may be closed by a screw cap 40.

In order to confine the grease in the bearing unit and prevent the same from leaking from the ends thereof into the conveyor trough and thus wasted as well as mingling with the material being conveyed, protecting means are provided consisting preferably of an outer or front disk or slinger 41 arranged on the unthreaded end of the sleeve and projecting laterally across the outer side of the wide outer or front flange of the bearing shell and terminating close to the large bore of the housing, and an inner or rear disk or slinger 42 arranged on the clamping screw nut and projecting laterally across the rear end of the housing. The opposing inner side of the disk 42 and the rear end of the housing are provided with intercalated annular ribs 43, 44 and cooperating grooves which together form a zig-zag or serpentine path which creates a labyrinth seal when the grease enters the same and thus prevents the grease from escaping. Grease is likewise prevented form escaping at the front or outer end of the bearing due to the tortuous passage formed by the wide flange of the bearing shell and the disk on the front end of the clamping sleeve, whereby an effective seal is formed which virtually prevents leakage of grease to the exterior of the bearing.

From the foregoing explanation it will now be apparent that this bearing will positively hold the lubricating grease so the same will effectively lubricate the wearing surfaces, and also permit of easily and conveniently replenishing the lubricant, thereby avoiding running the bearing dry and wearing the same unduly rapid.

If desired, cylindrical rolling members 47 may be used instead of balls. In Fig. 6 such a rolling member bears at one end against a shoulder 48 on an inner bearing ring 49 and at its other end against a shoulder 50 on an outer bearing ring 51 and the outer ring is enclosed by a shell 52 similar to that shown in Figs. 1 and 3. Figure 7 illustrates another way of mounting the bearing roller and is accomplished in this instance by engaging the inner side of the rolling member 47 with a groove 53 in the inner bearing ring 54 and providing the outer bearing ring 55 at one end with a shoulder 56 which engages with one end of the bearing roller and pressing a retaining ring 57 into the other end of the outer bearing ring.

In order to prevent the lubricating grease from creeping out through the space between the front disk 41 and the adjacent part of the rolling bearing the inner side of the disk 41 is provided with an annular groove 58 adjacent to its outer edge whereby the grease is caught in this groove and a trap is formed which seals the exit of this space against the escape of grease.

When the conveyor is in operation the material is forced in the direction of the arrow 59 and therefore produces a backward pull on the conveyor, the thrust of which is taken up by the rolling bearing at the same time this bearing sustains the radial load. Owing to the conical formation of the periphery of the adapter sleeve 15 and the bore of the inner bearing ring 17, this rearward pull on the conveyor tends constantly to tighten this joint so as to hold these parts reliably in position relatively to each other.

Inasmuch as the material is forced by the conveyor against the rear disk or slinger 42 with considerable pressure and therefore tends to retard the rotation of the same, the screw joint between the screw nut and the adapter sleeve is preferably made to wind up in the direction opposite to the rotation of the conveyor, so that the resistance to which the rear disk 42 is subjected while under the pressure of the material being conveyed will operate to further tighten the screw nut 8 instead of permitting the same to loosen.

For the purpose of reducing the frictional contact of the flowing material with the housing of the hanger, the rear disk 42 is made somewhat larger in diameter than the housing, as shown in Figs. 1 and 3, whereby the material upon being forced by the conveyor against the disk 42 will be deflected by the latter away from the periphery of the housing and thus engage the same with reduced friction, thereby reducing interference with the flow of the material to a minimum and enabling the conveyor to be operated with an expenditure of less power.

I claim as my invention:—

1. A bearing for a shaft, comprising a housing having a bore through which the shaft passes and which is composed of a portion of large diameter and a portion of small diameter, a rolling unit arranged around the shaft and within the large diameter portion of said bore and consisting of an outer bearing ring mounted in the housing, an inner bearing ring mounted on the shaft and rolling members interposed between said bearing rings, an adapter for mounting said inner bearing ring on said shaft and consisting of a split conical sleeve surrounding the shaft and arranged within the inner bearing ring and a screw nut arranged in the small diameter portion of said housing bore and engaging the adjacent end of the inner bearing ring and a thread on the adjacent part of the sleeve, a disk of large diameter arranged on said screw nut and extending across the joint between said nut and the housing and overlapping the front side of the housing, and a disk of small diameter arranged on the opposite end of the sleeve and located within the large diameter portion of said housing bore.

2. A bearing for a shaft, comprising a housing having a bore through which the shaft passes and which is composed of a portion of large diameter and a portion of small diameter, a rolling unit arranged around the shaft and within the large diameter portion of said bore and consisting of an outer bearing ring mounted in the housing, an inner bearing ring mounted on the shaft and rolling members interposed between said bearing rings, an adapter for mounting said inner bearing ring on said shaft and consisting of a split conical sleeve surrounding the shaft and arranged within the inner bearing ring and a screw nut arranged in the small diameter portion of said housing bore and engaging the adjacent end of the inner bearing ring and a thread on the adjacent part of the sleeve, a disk of large diameter arranged on said screw nut and extending across the joint between said nut and the housing, and overlapping the front side of the housing, a disk of small diameter arranged on the opposite end of the sleeve and located within the large diameter portion of said housing bore, said housing being provided with a lubricant supply duct communicating with the front end of the space between said bearing rings adjacent to the small diameter bore portion of the housing, and a closure for the space between the rear end of the space between the bearing rings within said large diameter bore portion of the housing.

3. A bearing for a shaft, comprising a housing having a bore through which the shaft passes and which is composed of a portion of large diameter and a portion of small diameter, a rolling unit arranged around the shaft and within the large diameter portion of said bore and consisting of an outer bearing ring mounted in the housing, an inner bearing ring mounted on the shaft and rolling members interposed between said bearing rings, an adapter for mounting said inner bearing ring on said shaft and consisting of a split conical sleeve surrounding the shaft and arranged within the inner bearing ring and a screw nut arranged in the small diameter portion of said housing bore and engaging the adjacent end of the inner bearing ring and a thread on the adjacent part of the sleeve, a disk of large diameter arranged on said screw nut and extending across the joint between said nut and the housing and overlapping the front side of the housing, a disk of small diameter arranged on the opposite end of the sleeve and located within the large diameter portion of said housing bore, said housing being provided with a lubricant supply duct communicating with the front end of the space between said bearing rings adjacent to the small diameter bore portion of the housing, and a casing for said rolling unit consisting of a cylindrical shell interposed between said outer bearing ring and the large bore portion of the housing, a narrow internal flange arranged at the front edge of the shell and engaging only with the front edge of the outer bearing ring so as to leave the front end of the space between the bearing rings open, and a wide internal flange arranged at the rear edge of the shell and engaging with rear edges of the bearing rings and extending across the space between the same.

4. A bearing for a shaft, comprising a housing having a bore through which the shaft passes and which is composed of a portion of large diameter and a portion of small diameter, a rolling unit arranged around the shaft and within the large diameter portion of said bore and consisting of an outer bearing ring mounted in the housing, an inner bearing ring mounted on the shaft and rolling members interposed between said bearing rings, an adapter for mounting said inner bearing ring on said shaft and consisting of a split conical sleeve surrounding the shaft and arranged within the inner bearing ring and a screw nut arranged in the small diameter portion of said housing bore and engaging the adjacent end of the inner bearing ring and a thread on the adjacent part of the sleeve, a disk of large diameter arranged on said screw nut and extending across the joint between said nut and the housing and overlapping the front side of the housing, a disk of small diameter arranged on the opposite end of the sleeve and located within the large diameter portion of said housing bore, said housing being provided with a lubricant supply duct communicating with the front end of the space between said bearing rings adjacent to the small diameter bore portion of the housing, and a U shaped locking key having one leg engaging said sleeve and the other leg engaging said screw nut.

In testimony whereof I hereby affix my signature.

EDWIN HAMBLETON.